United States Patent Office 3,549,744
Patented Dec. 22, 1970

3,549,744
METHOD OF MOLDING NONADHERENT HEAT VULCANIZABLE SILICONE RUBBER
Richard A. Compton, Milford, Conn., assignor to Dow Corning Corporation, Midland, Mich., a corporation of Michigan
No Drawing. Filed Oct. 10, 1967, Ser. No. 674,108
Int. Cl. B29b 1/100
U.S. Cl. 264—300
3 Claims

ABSTRACT OF THE DISCLOSURE

A heat vulcanizable silicone rubber composition which releases from metal surfaces without the use of any release agents. The heat vulcanizable silicone rubber composition includes an organopolysiloxane gum, a reinforcing filler, an organoperoxide vulcanizing agent and a metal salt of a carboxylic acid. The metal includes nickel, cadmium and copper and the carboxylic acids contain 16 to 26 carbon atoms per molecule. The metal salt of a carboxylic acid is present in amounts of 0.05 to 2 parts by weight per 100 parts by weight of the silicone rubber composition.

---

The present invention relates to a heat vulcanizable silicone rubber composition which releases from metal surfaces.

Many silicone rubber compositions adhere sufficiently enough to metal surfaces that they are a problem in molding operations, and a means of easy removal of the silicone rubber from the mold after vulcanization is desirable. One means of removing a rubber from a mold is to coat the mold, prior to use, with a release agent. The use of release agents is satisfactory in many cases, however, a release agent must be applied, the amount of release agent in the mold must be carefully watched to insure consistent release, and the release agent must be inert to the rubber surface.

It is therefore an object of the present invention to obtain a silicone rubber which releases from a metal mold. These and other objects will become apparent from the following detailed description of the present invention.

The present invention relates to a heat vulcanizable silicone rubber composition consisting essentially of (A) 100 parts by weight of a mixture comprising an organopolysiloxane gum having an average unit formula

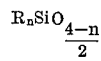

wherein each R is a monovalent organic radical selected from the group consisting of methyl, vinyl and phenyl radicals and $n$ has an average value of from 1.98 to 2.01 inclusive, there being at least 75 percent methyl radicals in the total number of R radicals, a reinforcing silica, and an organoperoxide vulcanizing agent and (B) from 0.05 to 2 inclusive parts by weight of a metal salt of a carboxylic acid wherein the metal is selected from the group consisting of nickel, cadmium, and copper and the carboxylic acid contains from 16 to 26 inclusive carbon atoms per molecule.

The mixture (A) is a basic silicone rubber composition which is well known in the art. The present invention, however, is limited to the organopolysiloxane gums which have an average of 1.98 to 2.01 monovalent organic radicals per silicon atom and the organic radicals are methyl, vinyl or phenyl radicals. The organopolysiloxane gums contain at least 75 percent methyl radicals of the total number of R radicals, preferably, there are 90 percent methyl radicals present in the organopolysiloxane gum. The organopolysiloxane gums can be homopolymers, copolymers, mixtures of homopolymers, mixtures of copolymers or mixtures of homopolymers and copolymers. The organopolysiloxane gums can contain siloxane units such as dimethylsiloxane units, trimethylsiloxane units, monomethylsiloxane units, methylvinylsiloxane units, methylphenylsiloxane units, diphenylsiloxane units, methylphenylvinylsiloxane units, dimethylvinylsiloxane units, diphenylvinylsiloxane units, monovinylsiloxane units and monophenylsiloxane units among others. The organopolysiloxane gums can be polymers which have triorganosiloxane endblocking or they can be endblocked by hydroxyl radicals. Thus, the silicon atoms are linked by oxygen atoms and those oxygen atoms not linking two silicon atoms are bonded to hydrogen atoms to form the hydroxyl endblocking.

The reinforcing silica fillers include any of those which are well known in the art, including fume silica and silica aerogel as well as the treated silicas wherein the silicas are treated with organosilicon compounds such as organosilanes and organopolysiloxanes.

The organoperoxide vulcanizing agent includes any of the well known organic peroxides which are suitable for vulcanizing silicone rubber. These organoperoxide vulcanizing agents include benzoyl peroxide, t-butylperbenzoate, dicumyl peroxide, 2,4-dichlorobenzoyl peroxide, di-t-butyl peroxide and 2,5-bis-(t-butylperoxy)-2,5-dimethylhexane.

In addition to the foregoing ingredients the heat vulcanizable silicone rubber composition can contain heat stability additives, organic and inorganic fillers, compression set additives, additives to improve the handling properties, additives to prevent crepe aging and any other ingredient which can be added to heat vulcanizable silicone rubber compositions.

The ratio of the ingredients can vary broadly as is well known in the art. Thus, the amount of reinforcing silica can vary from 10 to 200 parts by weight per 100 parts of the organopolysiloxane gum and the organoperoxide vulcanizing agent can vary from 0.1 to 10 parts by weight per 100 parts of the organopolysiloxane gum. The foregoing proportions are those most commonly found in the art.

The combination of 100 parts of the mixture (A) with 0.05 to 2 parts by weight of a metal salt of a carboxylic acid was found to provide a heat vulcanizable silicone rubber composition which will release from a metal mold without the use of any release agent. The metal salts of carboxylic acids useful for this invention include carboxylic acid salts of nickel, cadmium, and copper. The carboxylic acids are any of those which have 16 to 26 inclusive carbon atoms per molecule such as palmitic acid, margaric acid, stearic acid, nonadecanoic acid, arachidic acid, heneicosanoic acid, behenic acid, tricosanoic acid, tetracosanoic acid, pentacosanoic acid and cerotic acid. Examples of the metal salts of carboxylic acids includes nickel palmitate, cadmium cerotate, cadmium stearate, nickel tricosanoate, nickel stearate, cadmium tetracosanoate, nickel margarate, nickel behenate, nickel pentacosanoate and nickel nonadecanoate.

It is preferred that the compound (B) be present in amounts of 0.1 to 0.3 inclusive parts by weight per 100 parts by weight of (A). The preferred compound (B) is a metal salt of a carboxylic acid and of these salts the preferred metal salts of carboxylic acids are those of nickel wherein the carboxylic acid contains from 18 to 24 inclusive carbon atoms per molecule. The preferred range and species provide the most economical range as well as the most suitable overall properties of the silicone rubber.

The composition of this invention when vulcanized against a metal surface will release therefrom with ease. The composition of this invention is a heat vulcanizable silicone rubber which when used as a molding composition will readily release from metal molds without the aid of a mold release agent on the molding surface.

This invention also relates to a method of molding silicone rubber comprising placing a heat vulcanizable silicone rubber composition comprising an organopolysiloxane gum having an average unit formula

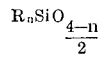

wherein each R is a monovalent organic radical selected from the group consisting of methyl, vinyl and phenyl radicals and $n$ has an average value of from 1.98 to 2.01 inclusive, there being at least 75 percent methyl radicals in the total number of R radicals, a reinforcing silica and an organoperoxide vulcanizing agent, in a metal mold, heating the mold to vulcanize the heat vulcanizable silicone rubber composition and thereafter removing a molded silicone rubber article, the improvement consisting essentially of adding 0.05 to 2 inclusive parts by weight of a metal salt of a carboxylic acid wherein the metal is selected from the group consisting of nickel, cadmium, and copper to 100 parts by weight of the heat vulcanizable silicone rubber composition whereby the molded silicone rubber article readily releases from the metal mold.

The heat vulcanizable silicone rubber composition is prepared by mixing the ingredients in any conventional manner such as by milling on a rubber mill. The ingredients can be combined in any order.

The heat vulcanizable composition prepared can then be placed in a metal mold, such as stainless steel, cold-rolled steel, iron, magnesium, aluminum, copper, brass, tin, tin plated and the like. Conventional means of molding silicone rubber are used. The mold is heated to vulcanize the silicone rubber and then the molded silicon rubber article is removed. Any of the conventional molding techniques can be used with the present heat vulcanizable silicone rubber composition as long as it contains 0.05 to 2 parts of the metal salt of a carboxylic acid per 100 parts of rubber composition. The heat vulcanized silicone rubber composition is an improved silicone rubber in that the vulcanized product readily releases from a metal surface.

The following examples are illustrative only and should not be construed as limiting the present invention which is properly delineated in the appended claims.

EXAMPLE 1

The following heat vulcanizable silicone rubber compositions were prepared by milling on a rubber mill.

(A)

100 parts by weight of a dimethylpolysiloxane gum having dimethylvinylsiloxy endblocking,
35 parts by weight of a reinforcing silica,
8 parts by weight of a hydroxylated methylpolysiloxane fluid,
4 parts by weight of diphenylsilanediol,
3.5 parts by weight of a methylvinylpolysiloxane (1)

100 parts by weight of (A) and
1.0 part by weight of 2,5-bis-(t-butylperoxy)-2,5-dimethylhexane.

(2)

100 parts by weight of (A) and
0.25 part by weight of nickel stearate
1.0 part by weight of 2,5-bis-(t-butylperoxy)-2,5-dimethylhexane.

(3)

100 parts by weight of (A) and
0.5 part by weight of nickel stearate
1.0 part by weight of 2,5-bis-(t-butylperoxy)-2,5-dimethylhexane.

(4)

100 parts by weight of (A) and
1.0 part by weight of nickel stearate
1.0 part by weight of 2,5-bis-(t-butlyperoxy)-2,5-dimethylhexane.

(5)

100 parts by weight of (A) and
2.0 parts by weight of nickel stearate
1.0 part by weight of 2,5-bis-(t-butylperoxy)-2,5-dimethylhexane.

Each of the above mixtures was press vulcanized for 10 minutes at 340° F. in a chase mold having a stainless steel surface on one side of the heat vulcanizable silicone rubber and a magnesium surface forming the other side. After the composition was vulcanized, the silicone rubber article was removed from the chase mold. The release of the silicone rubber article from both surfaces was equivalent. The ease of release from the mold was given the ratings of poor, fair, good, very good and excellent. A silicone rubber article receiving a poor rating was an article which adhered to the metal surfaces and could only be removed with strong pulling. A silicone rubber article receiving an excellent rating would separate from the metal mold surfaces without the use of any applied force. The ratings of fair, good and very good fall between these two extremes.

The above heat vulcanized silicone rubber articles were given the release rating as indicated in the following table along with some physical properties.

| Composition | Release | Durometer | Tensile, p.s.i. | Percent elongation | Die "B" tear, p.p.i. |
|---|---|---|---|---|---|
| (1) | Poor | 48 | 1,500 | 750 | 150 |
| (2) | Good | 48 | 1,240 | 630 | 125 |
| (3) | do | 49 | 1,220 | 670 | 146 |
| (4) | do | 43 | 1,270 | 840 | 173 |
| (5) | do | 37 | 1,025 | 970 | 186 |

EXAMPLE 2

The heat vulcanizable silicone rubber composition of Example 1, (1) was mixed with various metal salts of carboxylic acids at two different concentrations. Each composition was prepared by milling on a rubber mill. The compositions were (a)

100 parts by weight of (A) of Example 1, 1 part by weight of 2,5-bis-(t-butylperoxy)-2,5-dimethylhexane, and 0.12 part by weight of copper stearate.

(b)

100 parts by weight of (A) of Example 1, 1 part by weight of 2,5-bis-(t-butylperoxy)-2,5-dimethylhexane, and 0.25 part by weight of copper stearate.

(c)

100 parts by weight of (A) of Example 1, 1 part by weight of 2,5-bis-(t-butylperoxy)-2,5-dimethylhexane, and 0.12 part by weight of cadmium stearate.

(d)

100 parts by weight of (A) of Example 1, 1 part by weight of 2,5-bis-(t-butylperoxy)-2,5-dimethylhexane, and 0.25 part by weight of cadmium stearate.

Each of the above heat vulcanizable silicone rubber compositions was molded and vulcanized as described in Example 1. The results were as shown in the following table:

|   | Release | Durometer | Tensile, p.s.i. | Percent elongation | Die "B" tear, p.p.i. |
|---|---|---|---|---|---|
| Composition: | | | | | |
| (a) | Very good | 44 | 1,490 | 800 | 172 |
| (b) | Excellent | 36 | 1,340 | 1,090 | 224 |
| (c) | Good | 45 | 1,530 | 770 | 163 |
| (d) | Excellent | 45 | 1,540 | 780 | 148 |

EXAMPLE 3

When any one of nickel palmitate, nickel nonadecanoate, and nickel tricosanoate replaces the nickel stearate of Example 1, equivalent results are obtained.

EXAMPLE 4

When any of the following organopolysiloxane gums replace the dimethylpolysiloxane gum of Example 1, equivalent results are obtained.

(A) a dimethylpolysiloxane gum endblocked with trimethylsiloxy groups.

(B) a dimethylpolysiloxane gum endblocked with trimethylsiloxy groups and having 0.142 mol percent methylvinylsiloxane units.

(C) an organopolysiloxane gum having 30 mol percent dimethylsiloxane units, 60 mol percent methylphenylsiloxane units and 10 mol percent diphenylsiloxane units and having hydroxyl endblocking.

(D) a dimethylpolysiloxane gum having methylphenylvinylsiloxy endblocking, 2 mol percent monomethylsiloxane units and 7.5 mol percent methylphenylsiloxane units.

(E) a diorganopolysiloxane gum consisting of a mixture of 70 weight percent of a dimethylvinylsiloxy endblocked dimethylpolysiloxane gum and 30 weight percent of an organopolysiloxane gum having 70 mol percent dimethylsiloxane units and 30 mol percent methylvinylsiloxane units.

That which is claimed is:

1. In a method of molding silicone rubber comprising placing a heat vulcanizable silicone rubber composition comprising an organopolysiloxane gum having an average unit formula $$R_n SiO_{\frac{4-n}{2}}$$

wherein each R is a monovalent organic radical selected from the group consisting of methyl, vinyl and phenyl radicals and $n$ has an average value of from 1.98 to 2.01 inclusive, there being at least 75 percent methyl radicals in the total number of R radicals, a reinforcing silica and an organoperoxide vulcanizing agent, in a metal mold, heating the mold to vulcanize the heat vulcanizable silicone rubber composition and thereafter removing a molded silicone rubber article, the improvement consisting essentially of adding 0.05 to 2 inclusive parts by weight of a metal salt of a carboxylic acid wherein the metal is selected from the group consisting of nickel, cadmium and copper, to 100 parts by weight of the heat vulcanizable silicone rubber composition whereby the molded silicone rubber article readily releases from the mold.

2. The method in accordance with claim 1 wherein the metal mold is a stainless steel mold.

3. The method in accordance with claim 1 wherein the metal mold is a copper mold.

References Cited

UNITED STATES PATENTS

| | | | |
|---|---|---|---|
| 2,217,163 | 10/1940 | Fletcher | 260—36 |
| 2,816,089 | 12/1957 | Willis | 260—46.5 |
| 3,340,219 | 9/1967 | Stemmler | 260—32.6 |
| 2,983,694 | 5/1961 | Page et al. | 260—18 |
| 2,999,078 | 9/1961 | Delphenich | 260—22 |
| 3,098,833 | 7/1963 | Solomon | 260—18 |
| 3,137,665 | 6/1964 | Retford | 260—18 |
| 3,296,161 | 1/1967 | Kulpa | 260—18 |

OTHER REFERENCES

Christoffel et al.: Chemical Abstracts, vol. 56, 1962, col. 4977.

Simonds: Handbook of Plastics (1943), pp. 238–239.

DONALD E. CZAJA, Primary Examiner

M. I. MARQUIS, Assistant Examiner

U.S. Cl. X.R.

106—38.22, 38.24; 260—18, 31.2, 31.4, 37, 465; 264—300, 337, 338